(12) United States Patent
Yanada et al.

(10) Patent No.: US 8,735,838 B2
(45) Date of Patent: May 27, 2014

(54) RADIATION DETECTING APPARATUS

(75) Inventors: Toshikazu Yanada, Gunma (JP);
Shigenori Sekine, Gunma (JP); Takashi Yamada, Gunma (JP)

(73) Assignee: Nihon Kessho Koogaku Co., Ltd., Tatebayashi-shi (JP)

( * ) Notice: Subject to any disclaimer, the term of this patent is extended or adjusted under 35 U.S.C. 154(b) by 0 days.

(21) Appl. No.: 13/170,788

(22) Filed: Jun. 28, 2011

(65) Prior Publication Data

US 2012/0006992 A1    Jan. 12, 2012

(30) Foreign Application Priority Data

Jul. 7, 2010 (JP) ................................. 2010-155118

(51) Int. Cl.
G01T 1/20 (2006.01)
G01T 1/202 (2006.01)
G01T 1/164 (2006.01)

(52) U.S. Cl.
CPC ............... G01T 1/202 (2013.01); G01T 1/2018 (2013.01); G01T 1/1642 (2013.01); G01T 1/20 (2013.01)
USPC ...................................... 250/366; 250/361 R

(58) Field of Classification Search
CPC ..... G01T 1/202; G01T 1/2018; G01T 1/1644; G01T 1/1642; G01T 7/00; G01T 1/20
USPC ........................................................ 250/366
See application file for complete search history.

(56) References Cited

U.S. PATENT DOCUMENTS

| | | | |
|---|---|---|---|
| 6,114,703 A | 9/2000 | Levin et al. | |
| 6,292,529 B1 * | 9/2001 | Marcovici et al. | 378/19 |
| 6,362,480 B1 * | 3/2002 | Peter et al. | 250/366 |
| 6,844,570 B2 * | 1/2005 | Sekine et al. | 257/80 |
| 6,876,086 B2 * | 4/2005 | Sekine et al. | 257/777 |
| 7,138,632 B2 * | 11/2006 | Yamada et al. | 250/367 |
| 7,301,214 B2 * | 11/2007 | Sekine et al. | 257/432 |
| 7,399,972 B2 * | 7/2008 | Yanada et al. | 250/361 R |
| 7,507,971 B2 * | 3/2009 | Shibayama et al. | 250/371 |
| 7,696,620 B2 * | 4/2010 | Shibayama | 257/698 |
| 2006/0108523 A1 * | 5/2006 | Ue | 250/309 |

FOREIGN PATENT DOCUMENTS

| | | |
|---|---|---|
| JP | 2-59694 A | 2/1990 |
| JP | 2-195236 A | 8/1990 |
| JP | 6-109855 A | 4/1994 |

(Continued)

OTHER PUBLICATIONS

Japanese Office Action, Mar. 11, 2014, 6 pages.

Primary Examiner — Marcus Taningco
(74) Attorney, Agent, or Firm — Foley & Lardner LLP

(57) ABSTRACT

A radiation detecting apparatus comprises: a first detector that detects incidence of radiation; a plate-shaped detection substrate including a second detector that detects an incident position of the radiation to at least the first detector, and a first terminal that is electrically connected to the second detector; a wiring substrate including a second terminal and an external terminal that is electrically connected to the second terminal; and a connecting member that electrically connects the first terminal and the second terminal. The first terminal is arranged at one end of a main surface of the plate-shaped detection substrate. The detection substrate is mounted on the wiring substrate such that the main surface is substantially perpendicular to the wiring substrate in a state that the one end faces the wiring substrate. The first detector is arranged opposite to the main surface of the detection substrate.

8 Claims, 10 Drawing Sheets

(56) References Cited

FOREIGN PATENT DOCUMENTS

| JP | 10012851 A | * | 1/1998 |
| JP | 2003-084066 A | | 3/2003 |
| JP | 2008-286560 | | 11/2008 |

* cited by examiner

RADIATION DETECTING APPARATUS

CROSS-REFERENCE TO RELATED APPLICATIONS

This application is based upon and claims the benefit of priority from the prior Japanese Patent Application No. 2010-155118 filed on Jul. 7, 2010; the entire contents of which are incorporated herein by reference.

BACKGROUND OF THE INVENTION

1. Field of the Invention

The present invention relates to a radiation detecting apparatus.

2. Description of the Related Art

Conventionally, there has been a type of a radiation detecting device that has a configuration including a plurality of radiation detecting elements that are arrayed in a two-dimensional matrix shape. This radiation detecting device can detect a two-dimensional radiation image, and is used as a detecting device such as a multi-detector X-ray CT system that can obtain a plurality of sliced images by one-time X-ray irradiation, for example.

This radiation detecting device detects, for example, light from radiation detectors such as scintillators by light detectors such as photodiodes. To improve detection accuracy of radiation, increasing an effective area of a radiation detector relative to incidence of radiation is one effective method.

SUMMARY OF THE INVENTION

In accordance with one aspect of the present invention, a radiation detecting apparatus comprises: a first detector that detects incidence of radiation; a plate-shaped detection substrate including a second detector that detects an incident position of the radiation to at least the first detector, and a first terminal that is electrically connected to the second detector; a wiring substrate including a second terminal and an external terminal that is electrically connected to the second terminal; and a connecting member that electrically connects the first terminal and the second terminal. The first terminal is arranged at one end of a main surface of the plate-shaped detection substrate. The detection substrate is mounted on the wiring substrate such that the main surface is substantially perpendicular to the wiring substrate in a state that the one end faces the wiring substrate. The first detector is arranged opposite to the main surface of the detection substrate.

These and other objects, features, aspects, and advantages of the present invention will become apparent to those skilled in the art from the following detailed description, which, taken in conjunction with the annexed drawings, discloses preferred embodiments of the present invention.

DETAILED DESCRIPTION OF THE PREFERRED EMBODIMENTS

Figure 1:
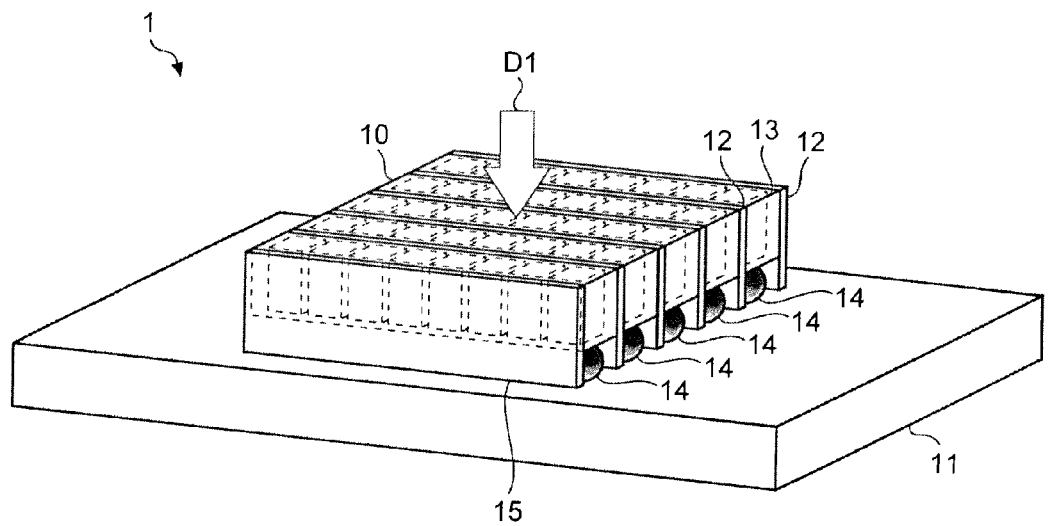
FIG. 1 is a perspective view of a schematic configuration of a radiation detecting apparatus according to a first embodiment of the present invention.

Exemplary embodiments of the present invention will be explained below in detail with reference to the accompanying drawings. In the following explanations, the drawings depict shapes, sizes, and positional relationships only schematically to such an extent that the contents of the present invention can be understood. Therefore, the present invention is not limited to the shapes, sizes, and positional relationships shown in the drawings. Furthermore, in the drawings, a part of hatched portions in a cross section is omitted to clarify configurations. In addition, numerical values exemplified below only represent preferred examples in the present invention, and thus the present invention is not limited to these values.

First Embodiment

A radiation detecting apparatus according to a first embodiment of the present invention is explained below in detail with reference to the drawings. FIG. 1 is a perspective view of a schematic configuration of the radiation detecting apparatus according to the first embodiment. As shown in FIG. 1, a radiation detecting apparatus 1 according to the first embodiment includes a wiring substrate 11 inside which wirings electrically connecting terminals (not shown) on an upper surface (hereinafter, "mounting surface SA") and terminal pins (not shown) on a back surface (hereinafter, "terminal surface SB") are formed, and a radiation detecting unit 10 that is mounted on the mounting surface SA of the wiring substrate 11. The radiation detecting unit 10 includes a configuration that quadrangular-prism radiation detecting-element arrays 13 and plate-shaped detection substrates 12 are alternately arrayed in a direction perpendicular to a long direction of the quadrangular-prism radiation detecting-element arrays 13, for example. The detection substrate 12 at one end of the alternate array can be replaced by a dummy substrate 15 for holding the radiation detecting-element array 13.

Figure 2:
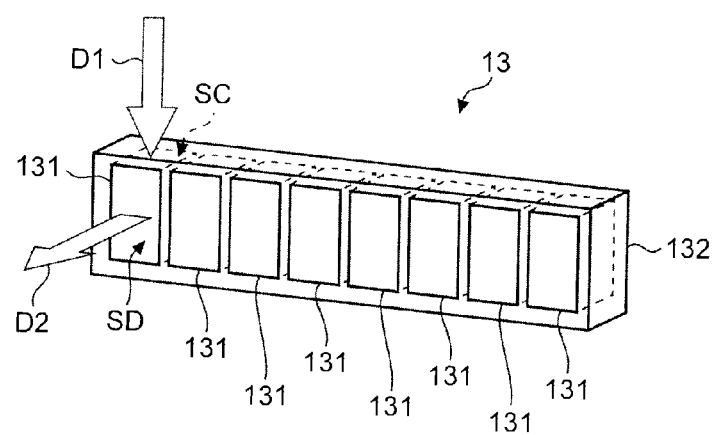
FIG. 2 is a perspective view of a schematic configuration of a radiation detecting-element array exemplified in the first embodiment.

An example of the radiation detecting-element array 13 is explained below in detail. FIG. 2 is a perspective view of a schematic configuration of a radiation detecting-element array exemplified in the first embodiment. As shown in FIG. 2, the radiation detecting-element array 13 includes a configuration that a plurality of radiation detecting elements 131 are arrayed in a line along a longitudinal direction of the radiation detecting-element array 13. For each of the radiation detecting elements 131, there can be used various kinds of scintillators that scintillate by incidence of radiation such as an inorganic crystal like cadmium tungstate (CWO) and an organic compound like a plastic scintillator, for example.

Each of the radiation detecting elements 131 has a rectangular parallelepiped shape, for example. However, the shape is not limited thereto, and can have various modifications such as a cylindrical shape. A surface of each of the radiation detecting elements 131 from which light is taken out when radiation enters (hereinafter, the surface is referred to as "light emission surface SD") is substantially perpendicular to a surface of the radiation detecting element 131 to which radiation enters (hereinafter, the surface is referred to as "radiation incident surface SC"), for example. In this configuration, an area of the light emission surface SD is larger than an area of the radiation incident surface SC, for example. That is, the radiation detecting element 131 includes a vertically-long rectangular parallelepiped shape that has the radiation incident surface SC as an upper surface, for example. With this configuration, more light may be taken out from the light emission surface SD.

The radiation detecting elements 131 are molded by a transparent resin 132 such as an epoxy resin through which light generated by the radiation detecting elements 131 can be transmitted, for example, such that the radiation detecting elements 131 are maintained in a state of being arrayed in a line. Alternatively, the radiation detecting elements 131 can be set in a transparent frame that is cut out into the shape of the radiation detecting elements 131, for example. When a liquid scintillator is used for the radiation detecting elements 131, for example, the liquid scintillator can be sealed in each vessel of a cartridge made of quartz or the like that includes vessels arrayed in a line.

The radiation incident surfaces SC of the radiation detecting elements 131 that are arrayed in a line face the same surface side. Similarly, the light emission surfaces SD of the radiation detecting elements 131 that are arrayed in a line face the same surface side. The detection substrate 12 that detects light irradiated from the radiation detecting elements 131 is arranged on a plane where the light emission surfaces SD of the radiation detecting elements 131 are arrayed.

Figure 3:
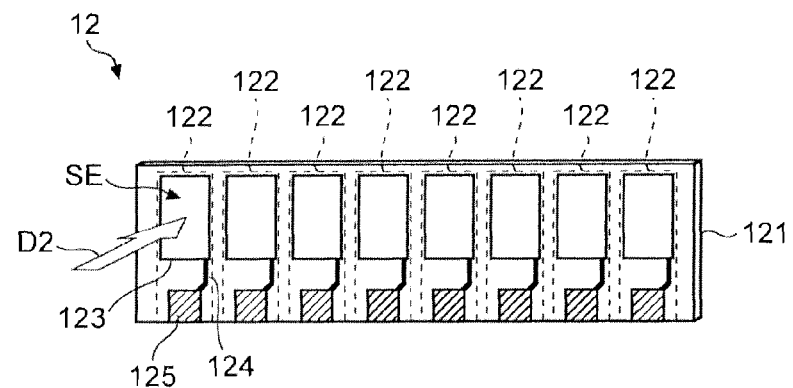
FIG. 3 is a perspective view of a schematic configuration of one main surface of a detection substrate according to the first embodiment.
Figure 4:
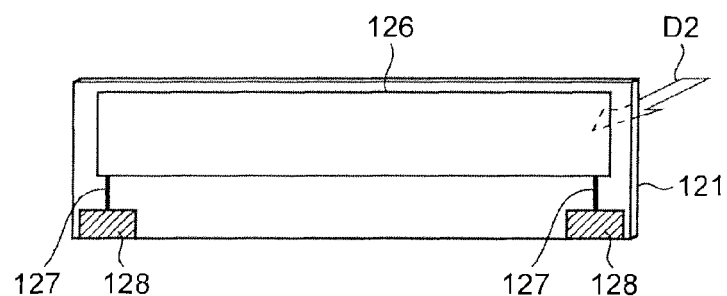
FIG. 4 is a perspective view of a schematic configuration of the other main surface of the detection substrate according to the first embodiment.

The detection substrates 12 according to the first embodiment are explained with reference to FIGS. 3 and 4. FIG. 3 is a perspective view of a schematic configuration of one main surface of the detection substrate according to the first embodiment. FIG. 4 is a perspective view of a schematic configuration of the other main surface of the detection substrate according to the first embodiment.

As shown in FIG. 3, the detection substrate 12 is configured to include photodiodes 122 that are formed by the number corresponding to that of the radiation detecting elements 131 included by one radiation detecting-element array 13, on a semiconductor substrate 121 made of silicon, for example. The photodiodes 122 are arrayed in a line such that the photodiodes 122 face individual radiation detecting elements 131 at one to one when the detection substrate 12 is adhered to the radiation detecting-element array 13. According to this configuration, it is possible to specify to which one of the radiation detecting elements 131 of the radiation detecting-element array 13 radiation has entered, by specifying one photodiode 122 that detects the incidence of radiation. As a result, it is possible to detect an incident position of the radiation to the radiation detecting-element array 13.

For anodes 123 of the photodiodes 122, a metal or a conductor through which light from the radiation detecting elements 131 can be transmitted is used, for example. The anodes 123 are electrically connected, via wirings 124, to a plurality of anode terminals 125 that are arrayed at one end of a main surface of the semiconductor substrate 121 having a plate shape. A metal material such as gold (Au) is preferably used for at least a surface of the anode terminals 125, by considering the wettability relative to solder 16 or the like to be described later. Alternatively, it is possible to use other materials having a high wettability relative to an adhesive that is used for mechanical or electrical connection between the wiring substrate 11 and the detection substrate 12.

Regarding the anode terminal 125 and the wiring 124, the anode terminal 125 can be provided on a main surface at the opposite side of one main surface of the semiconductor substrate 121 on which the anode 123 is formed, instead of the main surface on which the anode 123 is formed, for example. In this case, the wiring 124 electrically connects the anode 123 and the anode terminal 125 either by penetrating through the semiconductor substrate 121 or via an end of the semiconductor substrate 121.

As shown in FIG. 4, a cathode 126 that is common to the photodiodes 122 is provided on the main surface opposite to the main surface of the semiconductor substrate 121 on which the anodes 123 are formed. The cathode 126 is electrically connected, via wirings 127, to one or more cathode terminals 128 formed on the same main surface as that on which the cathode 126 is formed at an end side where the anode terminals 125 are arrayed, for example. In a similar manner to that applied to the anode terminals 125, a metal material such as gold (Au) can be used for at least a surface of the cathode terminals 128, by considering the wettability relative to the solder 16 or the like to be described later. Alternatively, it is possible to use other materials having a high wettability relative to an adhesive that is used for mechanical or electrical connection between the wiring substrate 11 and the detection substrate 12. The cathode terminals 128 can be provided on the main surface on which the anodes 123 are formed. In this case, the wiring 127 electrically connects the cathode 126 and the cathode terminals 128 either by penetrating through the semiconductor substrate 121 or via an end of the semiconductor substrate 121.

Figure 5:
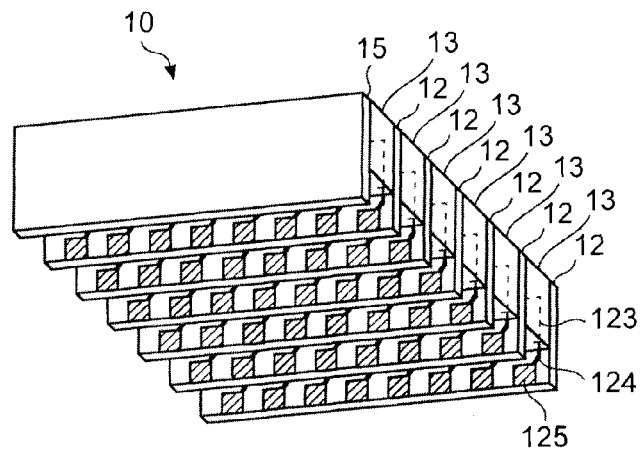
FIG. 5 is a perspective view of a schematic configuration of a terminal side of a radiation detecting unit according to the first embodiment.
Figure 6:
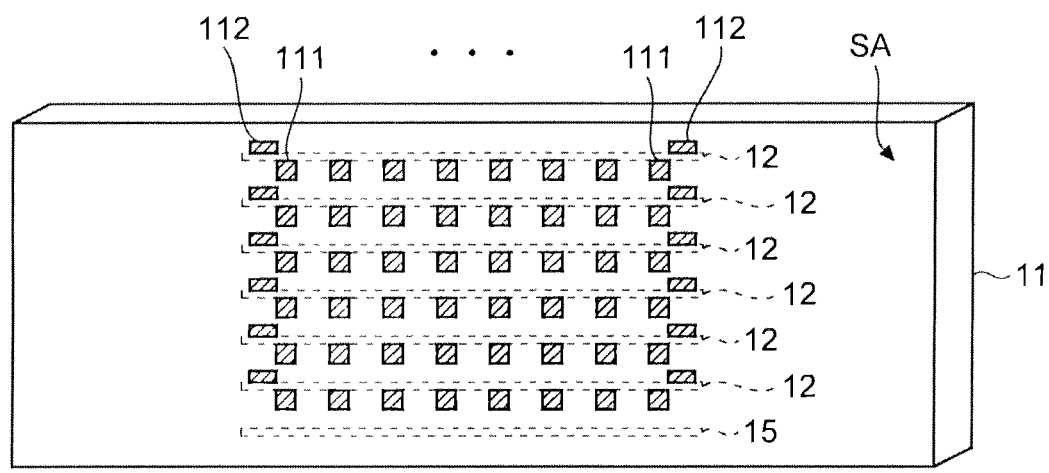
FIG. 6 is a perspective view of a schematic configuration of a mounting surface of a wiring substrate according to the first embodiment.

A configuration of a terminal side of the radiation detecting unit 10 and a configuration of the mounting surface SA of the wiring substrate 11 according to the first embodiment are explained next in detail with reference to the drawings. FIG. 5 is a perspective view of a schematic configuration of the terminal side of the radiation detecting unit according to the first embodiment. FIG. 6 is a perspective view of a schematic configuration of the mounting surface of the wiring substrate according to the first embodiment.

First, as shown in FIG. 5, the radiation detecting unit 10 includes the radiation detecting-element arrays 13 and the detection substrates 12 that are alternately adhered to each other such that the light emission surfaces SD of the radiation detecting elements 131 and the anodes 123 of the photodiodes 122 face each other at one to one. In this case, the radiation detecting-element arrays 13 and the detection substrates 12 are combined together such that the anode terminals 125 of the detection substrates 12 and the cathode terminals 128 are aligned at the same side. An adhesive material through which light generated by the radiation detecting-element arrays 13 can be transmitted such as an epoxy resin, for example, can be used to join the radiation detecting-element arrays 13 and the detection substrates 12. However, the radiation detecting-element arrays 13 and the detection substrates 12 are not necessarily required to be fixed to each other. For example, the radiation detecting-element arrays 13 and the detection substrates 12 can be optically and continuously adhered to each other by using optical grease.

Meanwhile, as shown in FIG. 6, a plurality of wiring terminals 111 and a plurality of ground terminals 112 are arrayed in a two-dimensional matrix shape on the mounting surface SA of the wiring substrate 11. The wiring terminals 111 are connected, at one to one, for example, to the anode terminals 125 of the radiation detecting unit 10 mounted on the mounting surface SA. The ground terminals 112 are connected, at one to one, for example, to the cathode terminals 128 of the radiation detecting unit 10 mounted on the mounting surface SA. The wiring terminals 111 and the anode terminals 125, and the ground terminals 112 and the cathode terminals 128 are connected to each other, respectively by a conductive material having adhesion properties such as the solder 16. Accordingly, terminals are electrically connected to each other, and the detection substrates 12 are fixed to the wiring substrate 11. Consequently, the radiation detecting unit 10 is mechanically and electrically connected to the wiring substrate 11. Alternatively, the radiation detecting unit can be fixed to the wiring substrate 11 by using an insulating adhesive, separately from the electrical connection between the terminals.

Figure 7:
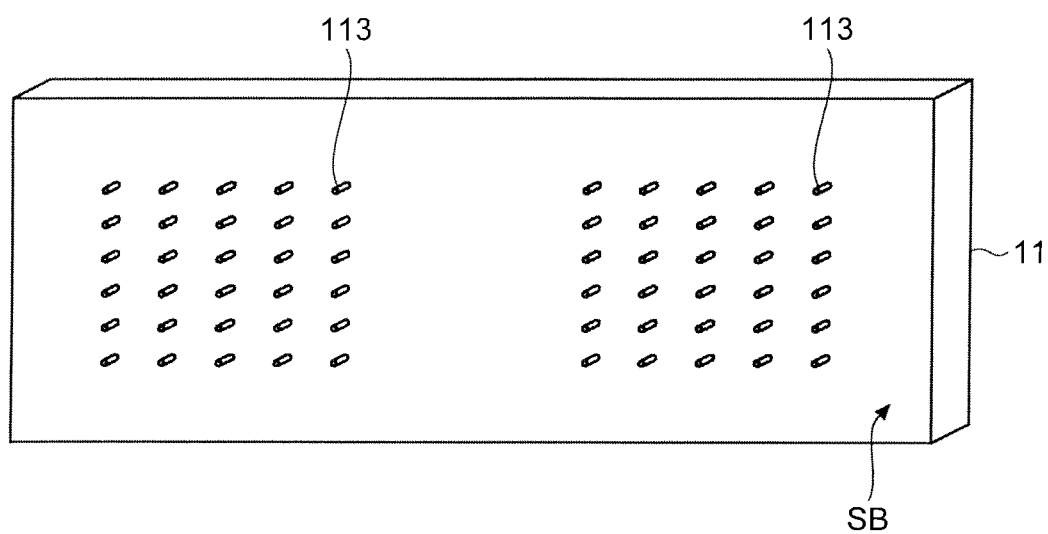
FIG. 7 is a perspective view of a schematic configuration of a terminal surface of the wiring substrate according to the first embodiment.

FIG. 7 is a perspective view of a schematic configuration of a terminal surface of the wiring substrate according to the first embodiment. As shown in FIG. 7, on the terminal surface SB of the wiring substrate 11, terminal pins 113 are provided as external terminals corresponding, at one to one, for example, to the wiring terminals and the ground terminals 112 that are provided on the terminal surface SA of the wiring substrate 11. These terminal pins 113 can be inserted into sockets provided on a circuit substrate or the like (not shown), for example.

Based on the configuration described above, when radiation enters from the radiation incident surface SC to the radiation detecting elements 131, the radiation detecting elements 131 irradiate light corresponding to the energy and amount of the incident radiation. The irradiated light is emitted from the light emission surfaces SD, and enters into the photodiodes 122 that are arrayed opposite to the light emission surfaces SD. The photodiodes 122 photoelectrically convert the incident light, and generate a current signal corresponding to the amount of light having entered from the radiation detecting elements 131. This current signal is transmitted to the terminal pins 113 that are provided on the terminal surface SB of the wiring substrate 11, via the wiring 124, the anode terminals 125, the wiring terminals 111, and wirings (not shown) inside the wiring substrate 11. The current signal is input from the terminal pins 113 to a detection circuit (not shown). As a result, this detection circuit detects to which one of the radiation detecting elements 131 the radiation has entered, as well as the level of the energy and amount of the incident radiation.

Figure 8:
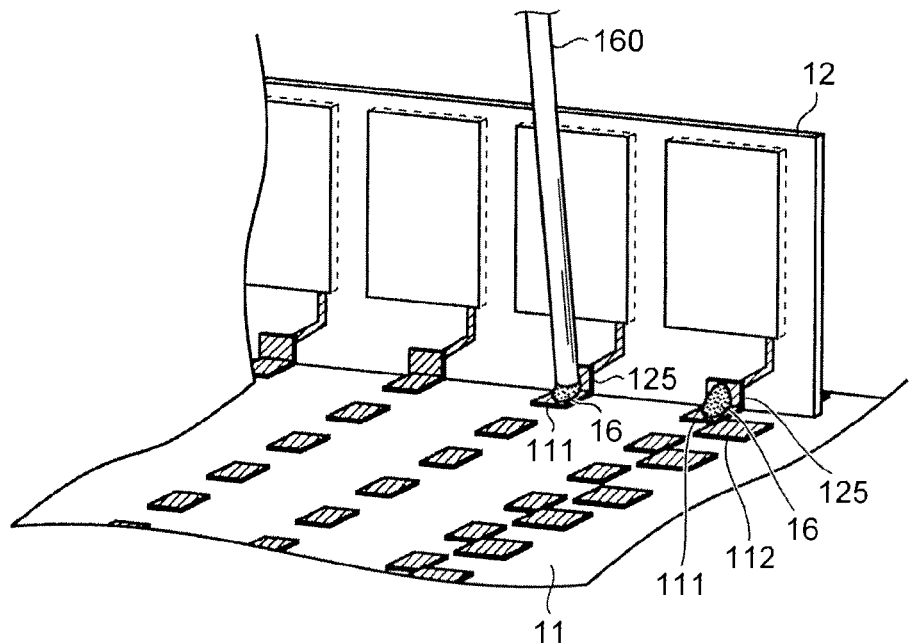
FIG. 8 is a partial perspective view for explaining an example of a manufacturing method of the radiation detecting apparatus according to the first embodiment (phase 1)
Figure 9:
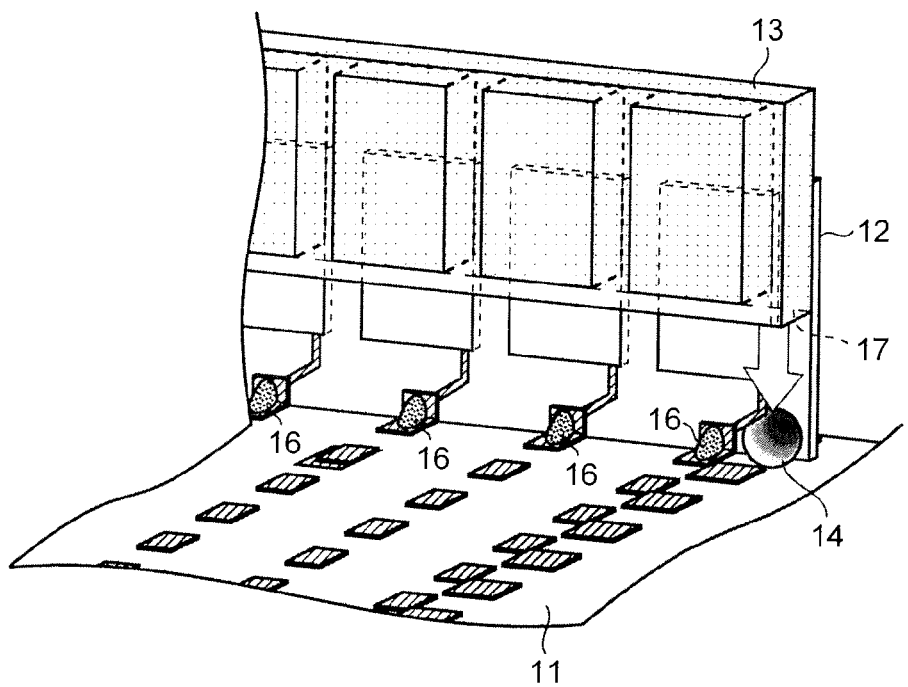
FIG. 9 is a partial perspective view for explaining the example of the manufacturing method of the radiation detecting apparatus according to the first embodiment (phase 2)
Figure 10:
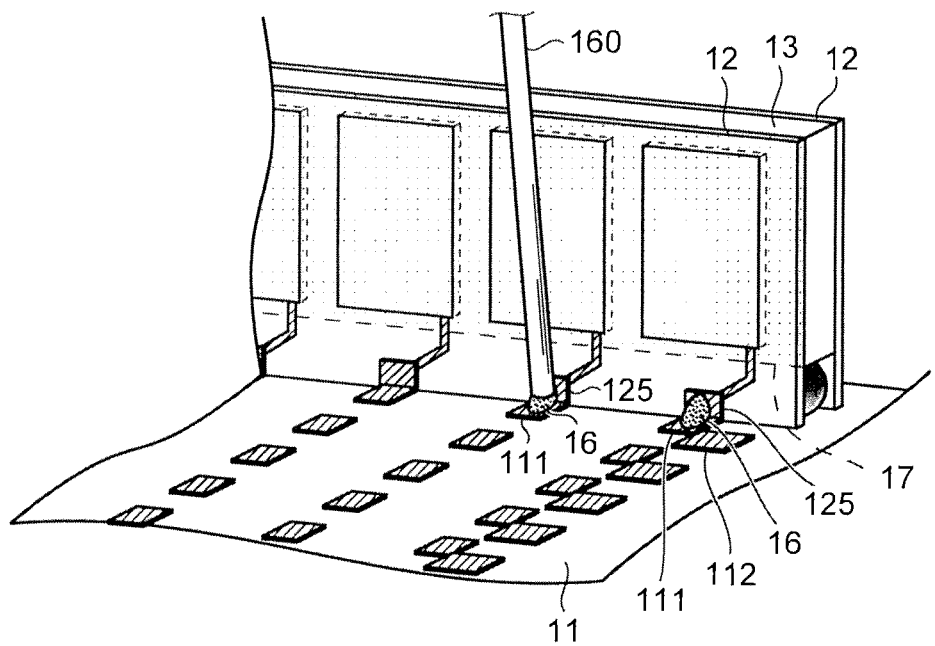
FIG. 10 is a partial perspective view for explaining the example of the manufacturing method of the radiation detecting apparatus according to the first embodiment (phase 3)

Next, a manufacturing method of the radiation detecting apparatus 1 according to the first embodiment is explained in detail with reference to the drawings. FIGS. 8 to 10 are partial perspective views for explaining an example of the manufacturing method of the radiation detecting apparatus according to the first embodiment. In the manufacturing method of the radiation detecting apparatus according to the first embodiment, two processes are alternately repeated by a predetermined number of times; which are a process of mechanically and physically connecting the detection substrate 12 to the wiring substrate 11 and a process of adhering the radiation detecting-element array 13 to the detection substrate 12.

Specifically, first, the detection substrate 12 is arranged substantially perpendicularly to the wiring substrate 11 as shown in FIG. 8. In this case, the detection substrate 12 is arranged on the wiring substrate such that the anode terminals 125 of the detection substrate 12 are positionally aligned to the wiring terminals 111 of the wiring substrate 11 and that the cathode terminals 128 of the detection substrate 12 are positionally aligned to the ground terminals 112 of the wiring substrate 11. However, the anode terminals 125 and the wiring terminals 111 are not required to be in contact with each other. Soldering is performed to electrically and mechanically connect the anode terminals 125 and the wiring terminals 111, by using an existing soldering robot, for example. In this soldering process, the solder 16 that is molten is pressed out from a front end of a nozzle 160 of the soldering robot to a contacting part between the anode terminals 125 and the wiring terminals 111 or a vicinity part thereof. Thereafter, the solder 16 is solidified to electrically and mechanically connect the detection substrate 12 and the wiring substrate 11.

The soldering explained with reference to FIG. 8 is performed to all the anode terminals 125 and to all the cathode terminals 128 on one detection substrate 12. Subsequently, after the solder 16 is cooled to be solidified, spacers 14 such as glass beads for positioning the radiation detecting elements 131 of the radiation detecting-element array 13 with the photodiodes 122 of the detection substrate 12 are mounted on the mounting surface SA of the wiring substrate 11, as shown in FIG. 9. An adhesive 17 through which light generated by the radiation detecting elements 131 is transmitted such as an epoxy resin, for example, is coated onto a contact surface between the radiation detecting-element array 13 and the detection substrate 12 having been solidified. Next, the radiation detecting-element array 13 is adhered to the detection substrate 12 by the adhesive 17 while mounting the radiation detecting-element array 13 on the spacers 13. Accordingly, the radiation detecting-element array 13 that forms a pair with a fixed detection substrate 12 is fixed to the detection substrate 12 and to the wiring substrate 11. The adhesive 17 can be coated onto a surface of the radiation detecting-element array 13, or onto a surface of the detection substrate 12, or onto both surfaces. The adhesive 17 is not required to be coated onto the whole contact surface between the detection substrate 12 and the radiation detecting-element array 13, but it suffices that the adhesive 17 is coated onto a part of the contact surface.

As described above, after the detection substrate 12 and the radiation detecting-element array 13 that form a pair are fixed to the wiring substrate 11, the adhesive 17 is coated onto a contact surface between the detection substrate 12 and the fixed radiation detecting-element array 13, and the detection substrate 12 is mounted on the mounting surface SA of the wiring substrate 11 such that respective terminals are positionally aligned in a similar manner to that applied in FIG. 8, as shown in FIG. 10. Next, soldering is performed such that the anode terminals 125 and the wiring terminals 111 are electrically and mechanically connected to each other, by using an existing soldering robot, for example, in a similar manner to that applied in FIG. 8.

Thereafter, the process explained with reference to FIG. 9 and the process shown in FIG. 10 are alternately repeated, thereby connecting the detection substrates 12 and the radiation detecting-element arrays 13 of a predetermined number, respectively, to the wiring substrate 11. However, a substrate that is finally joined to the radiation detecting-element array 13 is the dummy substrate for holding the radiation detecting-element array 13, for example. The dummy substrate 15 is fixed to the wiring substrate 11 by using an insulating adhesive, for example. When fixing the detection substrates 12 and the radiation detecting-element arrays 13 to the wiring substrate 11, one end or both ends of at least one of the detection substrates 12 and the radiation detecting-element arrays 13 in a longitudinal direction can be supported by a member of a glass substrate, for example.

First Modification

Figure 11:
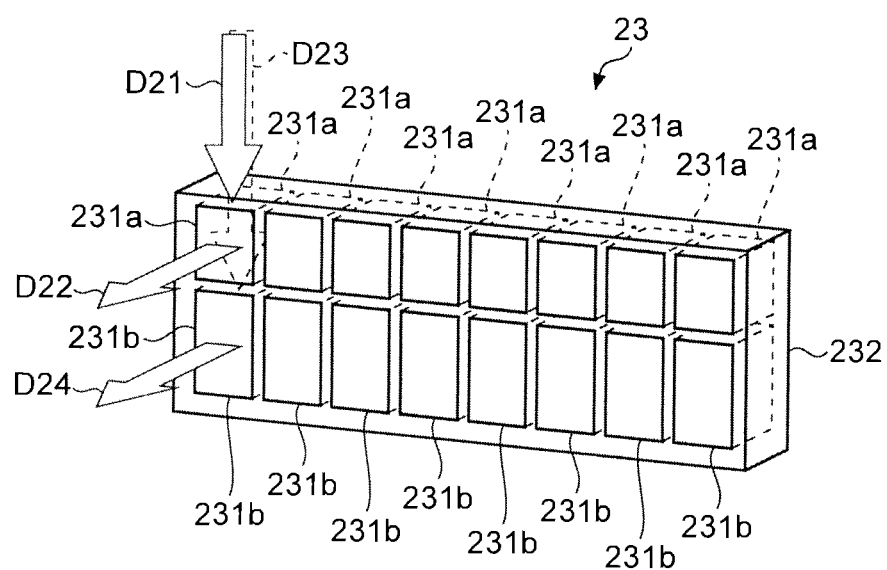
FIG. 11 is a perspective view of a schematic configuration of a radiation detecting-element array according to a first modification of the first embodiment.
Figure 12:
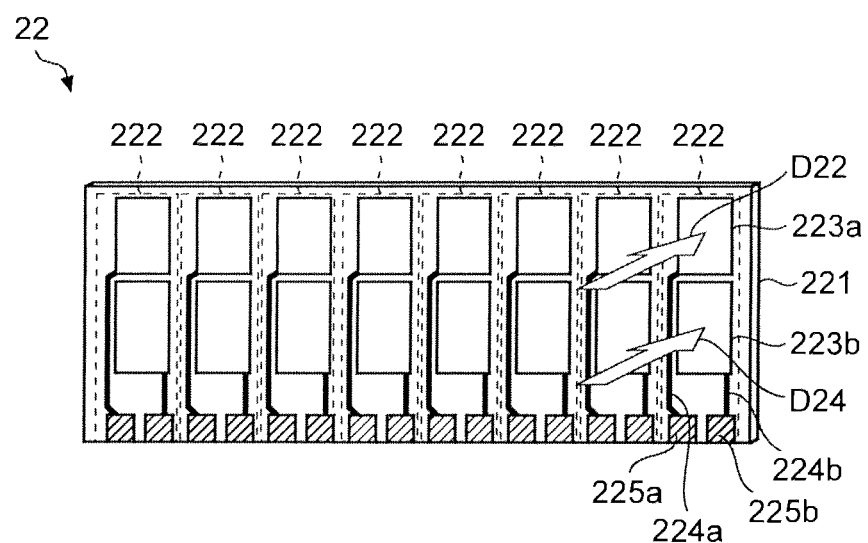
FIG. 12 is a perspective view of a schematic configuration of one main surface of a detection substrate according to the first modification of the first embodiment.
Figure 13:
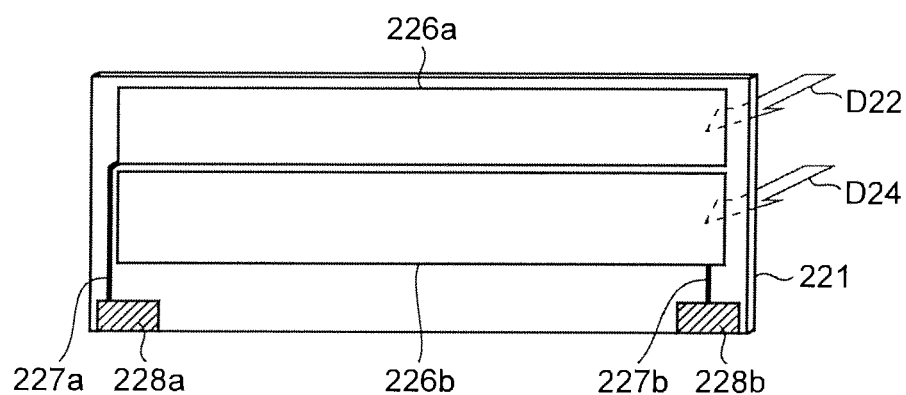
FIG. 13 is a perspective view of a schematic configuration of the other main surface of the detection substrate according to the first modification of the first embodiment.

The radiation detecting-element arrays according to the first embodiment described above can be configured such that the same or different kinds of radiation detecting elements are arrayed in two or more lines. FIG. 11 is a perspective view of a schematic configuration radiation detecting-element array according to a first modification of the first embodiment. FIG. 12 is a perspective view of a schematic configuration of one main surface of a detection substrate according to the first modification of the first embodiment. FIG. 13 is a perspective view of a schematic configuration of the other main surface of the detection substrate according to the first modification of the first embodiment.

As shown in FIG. 11, a radiation detecting-element array 23 according to the first modification includes a plurality of radiation detecting elements 231a that are arrayed in a line at an upper stage along a longitudinal direction of the radiation detecting-element array 23, and a plurality of radiation detecting elements 231b that are arrayed in a line at a lower stage along a longitudinal direction of the radiation detecting-element array 23. The radiation detecting elements 231a and 231b are molded by a transparent resin 232 such as an epoxy resin through which light generated by the radiation detecting elements 231a and 231b can be transmitted, for example, such that the radiation detecting elements 131 are maintained in a state of being arrayed in a line, in a similar manner to that of the radiation detecting-element array 13. The number of the radiation detecting elements 231a at the upper stage and the number of the radiation detecting elements 231b at the lower stage are the same, for example. That is, the radiation detecting-element array 23 is configured to include a pair of the upper and lower radiation detecting elements 231a and 231b that are arrayed in a line in a lateral direction, for example. The radiation detecting elements 231a and 231b can be of mutually the same kind or can be different kinds from each other.

In the radiation detecting-element array 23 described above, radiation first enters into the upper-stage radiation detecting elements 231a, and makes the radiation detecting elements 231a fluorescent. The radiation passes through the radiation detecting elements 231a by energy or the like, and enters into the lower-stage radiation detecting elements 231b, and makes the lower-stage radiation detecting elements 231b fluorescent.

Meanwhile, a detection substrate 22 according to the first modification is configured to include pairs of photodiodes 222 that are formed on a semiconductor substrate 221 made of silicon or the like, corresponding to the number of pairs of the radiation detecting elements 231a and 231b, for example. Each pair of the photodiodes 222 includes a pair of upper and lower diodes corresponding to a pair of the upper and lower radiation detecting elements 231a and 231b, respectively. Anodes 223a of the photodiodes at an upper stage are electrically connected, via a wiring 224a, respectively to a plurality of anode terminals 225a that are arrayed at one end of a main surface of the semiconductor substrate 221 having a plate shape. Similarly, anodes 223b of the photodiodes at a lower stage are electrically connected, via a wiring 224b, respectively to a plurality of anode terminals 225b that are arrayed in a line together with the anode terminals 225a at the same end as that where the anode terminals 225a are arrayed. The anode terminals 225a and the anode terminals 225b are not required to be alternately arrayed. Preferably, a metal material such as gold (Au) is used for at least surfaces of the anode terminals 225a and 225b, by considering the wettability relative to the solder 16 or the like, in a similar manner to that applied to the anode terminals 125. Alternatively, it is possible to use other materials having a high wettability relative to an adhesive to be used for mechanical or electrical connection between a wiring substrate and the detection substrate 22. Other configurations of the radiation detecting-element array 23 are identical to those of the radiation detecting-element array 13, and thus detailed explanations thereof will be omitted.

As shown in FIG. 13, a cathode 226a that is common to upper-stage photodiodes and a common cathode 226b that is common to lower-stage photodiodes are provided, respectively on a main surface that is at the opposite side of the main surface on which the anodes 223a and 223b of the semiconductor substrate 221 are formed. The cathodes 226a and 226b are electrically connected, via a wiring 227a or 227b, to one or more cathode terminals 228a or 228b that are formed on the same main surface as that on which the cathodes 226a and 226b are formed at an end side on which the anode terminals 225a and 225b are arrayed, for example. Preferably, a metal material such as gold (Au) is used for at least surfaces of the cathode terminals 228a and 228b, by considering the wettability relative to the solder 16 or the like, in a similar manner to that applied to the anode terminals 225a and 225b. Alternatively, it is possible to use other materials having a high wettability relative to an adhesive to be used for mechanical or electrical connection between the wiring substrate 11 and the detection substrate 22. Other configurations of the detection substrate 22 are identical to those of the detection substrate 12, and thus detailed explanations thereof will be omitted.

Second Modification

Figure 14:
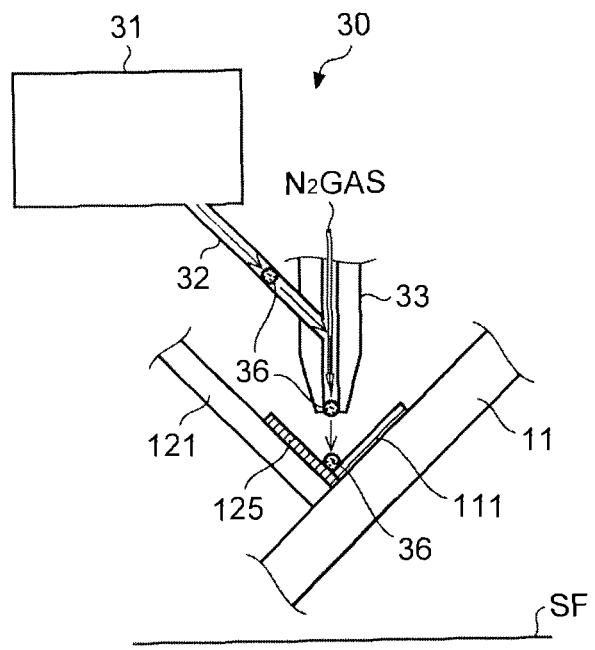
FIG. 14 is a schematic diagram for explaining a soldering process in a manufacturing method of a radiation detecting apparatus according to a second modification of the first embodiment.

A micro-soldering technique can be used for electrical and mechanical connection between anode terminals or cathode terminals of a detection substrate and wiring terminals or ground terminals of the wiring substrate. FIG. 14 is a schematic diagram for explaining a soldering process in a manufacturing method of a radiation detecting apparatus according to a second modification of the first embodiment.

As shown in FIG. 14, in a process of soldering the detection substrate 12 to the wiring substrate 11, a micro-soldering device 30 is used. The micro-soldering device 30 includes a micro-solder-ball supplying mechanism 31 that supplies molten solder, for example, to a solder supplying pipe 32, as a micro-solder ball 36 having a diameter of about 80 micrometers, for example. A nozzle 33 that ejects the micro-solder balls 36 is provided at a front end of the solder supplying pipe 32. An internal space of the solder supplying pipe 32 is linked to a cavity inside the nozzle 33. A nitrogen ($N_2$) gas, for example, is supplied to the cavity inside the nozzle 33 from an upstream. With this configuration, the micro-solder balls 36 that are supplied to the inside of the nozzle 33 are pushed out from a front end of the nozzle 33 to a stage (not shown).

The wiring substrate 11 is mounted on a stage of the micro-soldering device 30 in a state that the wiring substrate 11 is combined with the detection substrate 12 such that the wiring substrate 11 is substantially perpendicular to the detection substrate 12. The wiring substrate 11 is supported on a stage upper surface SF in an inclined state such that a contacting part or a vicinity part between the wiring terminal 111 and the anode terminal 125 or a contacting part or a vicinity part between the ground terminal 112 and the cathode terminal 128 faces the front end of the nozzle 33, for example. With this configuration, the micro-solder balls 36 that are ejected from the front end of the nozzle 33 are adhered to both the anode terminal 125 and the wiring terminal 111, and the detection substrate 12 is mechanically and electrically connected to the wiring substrate 11 by the micro-solder balls 36 having been solidified.

Figure 15:
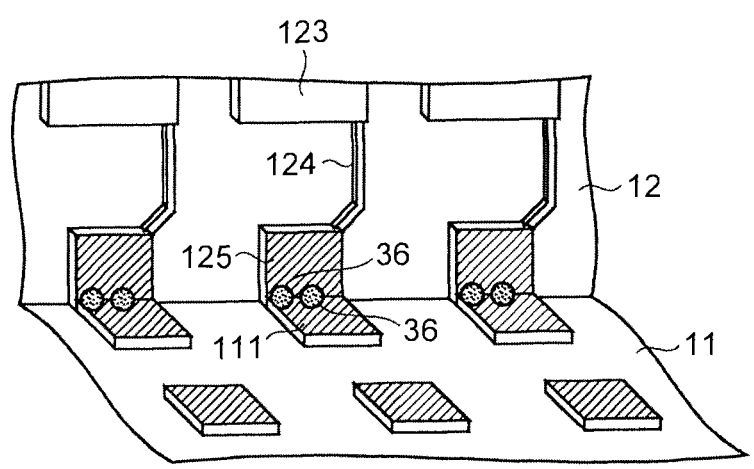
FIG. 15 is a partial perspective view of an example of connecting parts between wiring terminals and anode terminals according to the second modification of the first embodiment.

FIG. 15 is a partial perspective view of an example of connecting parts between wiring terminals and anode terminals according to the second modification. As shown in FIG. 15, the wiring terminals 111 and the anode terminals 125, or the ground terminals 112 and the cathode terminals 128 can be mechanically and electrically connected by a plurality of (two, for example) the micro-solder balls 36. With this configuration, terminals can be connected to each other more securely, and the connecting strength of connection between the detection substrate 12 and the wiring substrate 11 can be improved.

Second Embodiment

Figure 16:
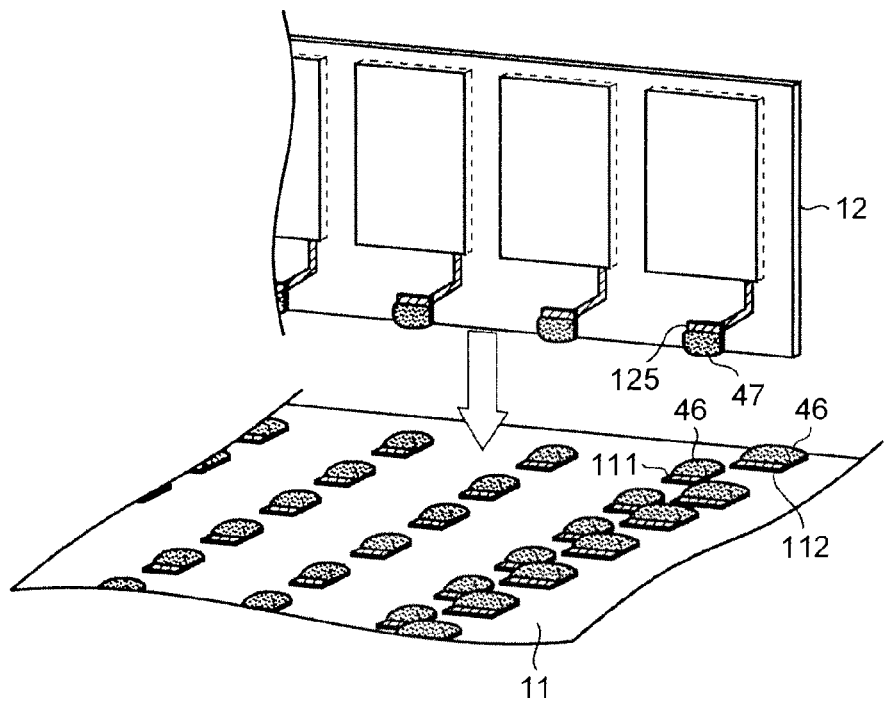
FIG. 16 is a partial perspective view for explaining an example of a manufacturing method of a radiation detecting apparatus according to a second embodiment of the present invention.
Figure 17:
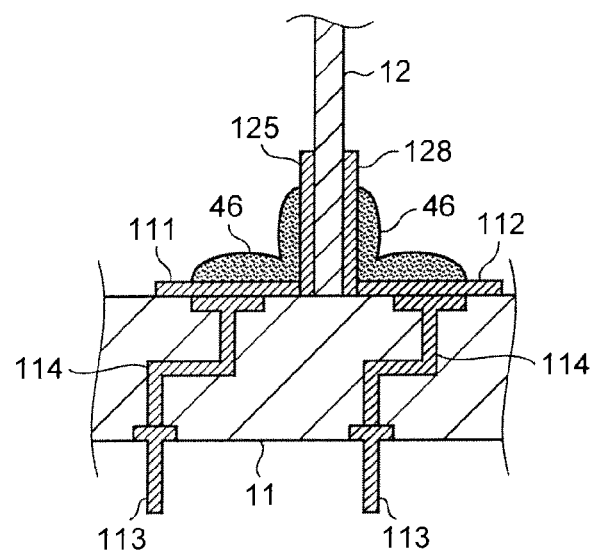
FIG. 17 is a schematic cross-sectional view of a schematic configuration of a detection substrate that is connected to a wiring substrate according to the second embodiment.

A radiation detecting apparatus according to a second embodiment of the present invention is explained next in detail with reference to the drawings. In the second embodiment, a wiring substrate is electrically and mechanically connected to a detection substrate by a reflow method. FIG. 16 is a partial perspective view for explaining an example of a manufacturing method of the radiation detecting apparatus according to the second embodiment. FIG. 17 is a schematic cross-sectional view of a schematic configuration of a detection substrate that is connected to a wiring substrate according to the second embodiment. In the second embodiment, similarly to the first embodiment, there is exemplified a case of using a wiring substrate, a detection substrate, and a radiation detecting-element array.

As shown in FIG. 16, in the second embodiment, the solder 46 is coated in advance onto each of the wiring terminals 111 and the ground terminals 112 of the wiring substrate 11 before assembling, and onto each of the anode terminals 125 and the cathode terminals 128 of the detection substrate before assembling. Instead of the solder 46, it is possible to use various other conductive adhesive materials, such as thermoplastic conductive materials and conductive resins that are cured by irradiating light such as radiation.

The detection substrate 12 on which the solder 46 is coated in advance is mounted on the wiring substrate 11 on which the solder 46 is coated in advance, such that the solder 46 on each of the wiring terminals 111 is brought into contact with the solder 46 on each of the anode terminals 125 and also such that the solder 46 on each of the ground terminals 112 is brought into contact with the solder 46 on each of the cathode terminals 128. The wiring substrate 11 and the detection substrate 12 that are combined with each other in this way are processed in a reflowing manner. As a result, the solder 46 on each terminal is molten and combined with each other, and thereafter cooled and solidified. Consequently, as shown in FIG. 17, the detection substrate 12 is electrically and mechanically connected to the wiring substrate 11 by the solidified solder 46.

Subsequently, the radiation detecting-element array 13 is mounted on the wiring substrate 11 by using a process identical to that explained with reference to FIG. 9 in the first embodiment. Thereafter, similar processes are repeated alternately, thereby connecting the detection substrates 12 and the radiation detecting-element arrays 13 of a predetermined number, respectively, to the wiring substrate 11. However, a substrate that is finally joined to the radiation detecting-element array 13 can be the dummy substrate 15 for holding the radiation detecting-element array 13, for example. The dummy substrate 15 can be fixed to the wiring substrate 11 by using an insulating adhesive, for example. When fixing the detection substrates 12 and the radiation detecting-element arrays 13 to the wiring substrate 11, one end or both ends of at least one of the detection substrates 12 and the radiation detecting-element arrays 13 in a longitudinal direction can be supported by a member of a glass substrate, for example. Other configurations and the manufacturing method of the second embodiment are identical to those of the first embodiment described above, and thus detailed explanations thereof will be omitted.

First Modification

Figure 18:
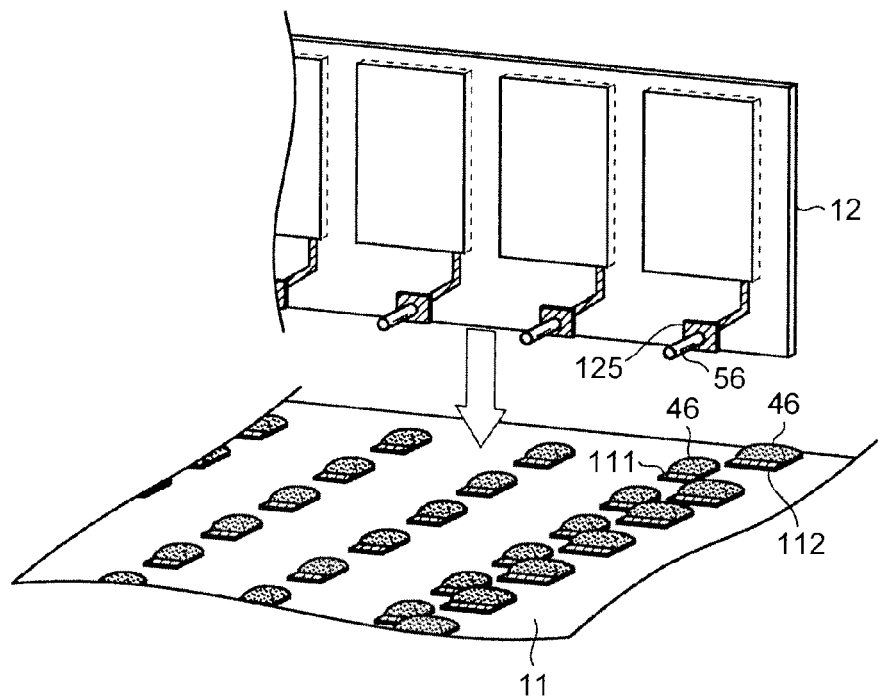
FIG. 18 is a partial perspective view for explaining another example of a manufacturing method of a radiation detecting apparatus according to a first modification of the second embodiment.
Figure 19:
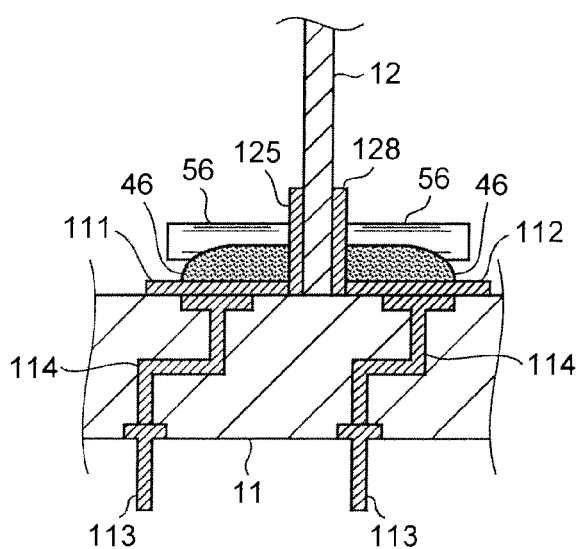
FIG. 19 is a schematic cross-sectional view of a schematic configuration of a detection substrate that is connected to a wiring substrate according to the first modification of the second embodiment.

Another connection method for connecting a wiring substrate and a detection substrate by using a reflow method is explained below in detail with reference to the drawings as a first modification of the second embodiment. FIG. 18 is a partial perspective view for explaining another example of a manufacturing method of a radiation detecting apparatus according to the first modification of the second embodiment. FIG. 19 is a schematic cross-sectional view a schematic configuration of the detection substrate that is connected to the wiring substrate according to the first modification of the second embodiment.

As shown in FIG. 18, in the first modification, a projection bump 56 is formed on each of the anode terminals 125 and each of the cathode terminals 128 of the detection substrate 12 before assembling, for example. A substance that is prepared by stacking plural metal bumps, for example, can be used for the bump 56. Alternatively, the bump 56 can be configured by using a conductive material having a high wettability relative to the anode terminal 125 and the cathode terminal 128, for example. Alternatively, the bump 56 can be configured such that a bump made of a bar-shaped conductive member is adhered to the anode terminal 125 and the cathode terminal 128, respectively, by solder or a conductive adhesive.

The detection substrate 12 having the bump 56 provided on each terminal is mounted on the mounting surface SA of the wiring substrate 11 such that the bump 56 is brought into contact with the solder 46 that is coated in advance on each terminal of the wiring substrate 11. The wiring substrate 11 and the detection substrate 12 that are combined with each other in this way are processed in a reflowing manner. As a result, the solder 46 at a side of the wiring substrate 11 is molten and is closely adhered to the bump 56, and thereafter cooled and solidified. Consequently, as shown in FIG. 19, the solidified solder 46 fixes the bump 56, and the detection substrate 12 is electrically and mechanically connected to the wiring substrate 11.

The radiation detecting-element array 13 is then mounted on the wiring substrate 11 by using a process identical to that explained with reference to FIG. 9 in the first embodiment. Thereafter, similar processes are repeated alternately, thereby connecting the detection substrates 12 and the radiation detecting-element arrays 13 of a predetermined number, respectively, to the wiring substrate 11. However, a substrate that is finally joined to the radiation detecting-element array 13 can be the dummy substrate 15 for holding the radiation detecting-element array 13, for example. The dummy substrate 15 can be fixed to the wiring substrate 11 by using an insulating adhesive, for example. When fixing the detection substrates 12 and the radiation detecting-element arrays 13 to the wiring substrate 11, one end or both ends of at least one of the detection substrates 12 and the radiation detecting-element arrays 13 in a longitudinal direction can be supported by a member of a glass substrate, for example. Other configurations and the manufacturing method of this modification are identical to those of the first embodiment, and thus detailed explanations thereof will be omitted.

Third Embodiment

Figure 20:
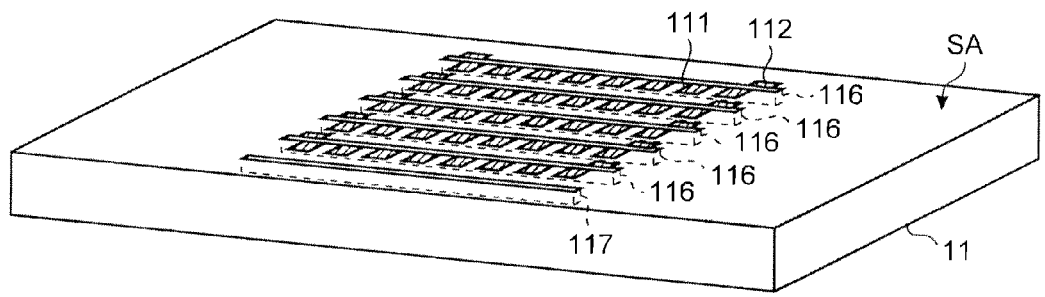
FIG. 20 is a perspective view of a schematic configuration of a wiring substrate according to a third embodiment of the present invention.
Figure 21:
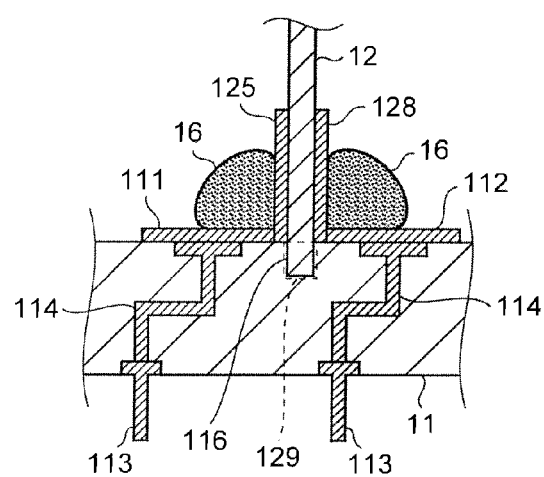
FIG. 21 is a schematic cross-sectional view of a schematic configuration of a detection substrate that is connected to the wiring substrate according to the third embodiment.

A radiation detecting apparatus according to a third embodiment of the present invention is explained below in detail with reference to the drawings. FIG. 20 is a perspective view of a schematic configuration of a wiring substrate according to the third embodiment. FIG. 21 is a schematic cross-sectional view of a schematic configuration of the detection substrate that is connected to the wiring substrate according to the third embodiment. In the following explanations, constituent elements identical to those of the first and second embodiments and modifications thereof are denoted by like reference numerals and redundant explanations thereof will be omitted.

As shown in FIG. 20, in the third embodiment, slits 116 into each of which a part of the detection substrate 12 is inserted and a slit 117 into which the dummy substrate 15 is inserted are provided on the mounting surface SA of the wiring substrate 11. The anode terminal 125 and the cathode terminal 128 of the detection substrate 12 are provided at positions that are separated from an end by about a depth of each of the slits 116. That is, as shown in FIG. 21, a region 129 to be engaged with the slit 116 is secured at an end where the anode terminal 125 and the cathode terminal 128 of the detection substrate 12 are arrayed. Other configurations of the third embodiment are identical to those of the first and second embodiments and the modifications thereof described above, and thus detailed explanations thereof will be omitted.

According to the above embodiments and modifications, plate-shaped detection substrates that detect incident positions of radiation to radiation detecting-element arrays can be installed substantially perpendicularly to a wiring substrate. Therefore, an area occupied by detection substrates in an incident surface of radiation can be reduced. Accordingly, an effective area of radiation detecting elements relative to incidence of radiation can be increased.

According to the present invention, plate-shaped detection substrates that detect incident positions of radiation to a first detector that detects radiation incidence can be installed substantially perpendicularly to a wiring substrate. Therefore, an area occupied by detection substrates in a radiation detection region can be reduced. With this configuration, a radiation detecting apparatus that can have a large effective area of the first detector relative to incidence of radiation can be achieved.

What is claimed is:

1. A radiation detecting apparatus comprising:
a first detector that detects incidence of radiation and has a radiation incident surface to which radiation enters and a light emission surface from which light is taken out when radiation enters to the radiation incident surface, the radiation incident surface being arranged substantially perpendicular to a direction of the incidence of radiation and the light emission surface being arranged substantially parallel to the direction of the incidence of radiation;
a plate-shaped detection substrate including a second detector that detects an incident position of the radiation to at least the first detector and has a light receiving surface to which the light taken out from the light emission surface enters, and a first terminal that is electrically connected to the second detector, the light receiving surface of the second detector being arranged parallel to the direction of the incidence of radiation;
a wiring substrate including a second terminal disposed on a main surface of the wiring substrate and an external terminal that is electrically connected to the second terminal; and
a connecting member that is made of solder or a conductive adhesive and electrically connects the first terminal and the second terminal,
the first terminal being arranged at one end of the main surface of the plate-shaped detection substrate,
the detection substrate being mounted on the wiring substrate such that the main surface of the plate-shaped detection substrate is substantially perpendicular to the main surface of the wiring substrate in a state that the one end faces the wiring substrate and such that the first terminal is substantially perpendicular to the second terminal, and
the first detector being arranged opposite to the main surface of the detection substrate,
wherein the connecting member fixes the detection substrate to the wiring substrate, such that the main surface of the detection substrate is fixed substantially perpendicularly to the wiring substrate.

2. The radiation detecting apparatus according to claim 1, wherein
the second detector includes a plurality of detection circuits each of which has a detection surface on which an incident position of the radiation to the first detector is detected, and a plurality of the first terminals that are electrically connected respectively to the detection circuits, the detection surfaces of the detection circuits are arrayed in a line substantially in parallel with the one end on the main surface of the plate-shaped detection substrate, the first terminals are arrayed at the one end, the wiring substrate includes a plurality of the second terminals, and the connecting member electrically connects respectively the first terminals and the second terminals.

3. The radiation detecting apparatus according to claim 1, further comprising:

a plurality of the detection substrates that are arrayed such that each of main surfaces of the detection substrates becomes in parallel with a perpendicular direction of the main surface of the wiring substrate; and a plurality of the first detectors that are arranged opposite to the main surface of each of the detection substrates.

4. The radiation detecting apparatus according to claim 1, wherein the first detector includes a plurality of detecting elements that are arrayed in a line and detect incidence of the radiation, and the second detector detects an incident position of the radiation by detecting to which one of the detecting elements the radiation has entered.

5. The radiation detecting apparatus according to claim 1, wherein the connecting member is a micro-solder ball.

6. The radiation detecting apparatus according to claim 1, wherein at least one of surfaces of the first and second terminals is made of gold.

7. The radiation detecting apparatus according to claim 1, wherein the first detector is made of a scintillator, and the second detector is made of a photodiode.

8. The radiation detecting apparatus according to claim 1, wherein a slit is formed on a surface of the wiring substrate on which the detection substrate is formed, and a part of the detection substrate is engaged with the slit.

* * * * *